US009591054B2

(12) United States Patent
Thornburgh et al.

(10) Patent No.: US 9,591,054 B2
(45) Date of Patent: Mar. 7, 2017

(54) MULTIPROTOCOL MULTICAST STREAMING PROXY

(71) Applicant: Adobe Systems Incorporated, San Jose, CA (US)

(72) Inventors: Michael C. Thornburgh, San Jose, CA (US); Srinivas R. Manapragada, San Ramon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 198 days.

(21) Appl. No.: 14/316,096

(22) Filed: Jun. 26, 2014

(65) Prior Publication Data

US 2015/0381680 A1    Dec. 31, 2015

(51) Int. Cl.
| | |
|---|---|
| *G06F 15/16* | (2006.01) |
| *H04L 29/08* | (2006.01) |
| *H04L 29/06* | (2006.01) |
| *H04N 21/61* | (2011.01) |
| *H04N 21/6405* | (2011.01) |
| *H04N 21/845* | (2011.01) |

(52) U.S. Cl.
CPC ............ *H04L 67/02* (2013.01); *H04L 65/105* (2013.01); *H04L 65/4076* (2013.01); *H04L 65/4084* (2013.01); *H04N 21/6125* (2013.01); *H04N 21/6405* (2013.01); *H04N 21/8456* (2013.01)

(58) Field of Classification Search
CPC ..... H04L 65/60; H04L 67/02; H04L 65/4076; H04L 65/105; H04L 65/4084; H04N 21/6125; H04N 21/6405; H04N 21/8456

USPC .................................................. 709/223–231
See application file for complete search history.

(56) References Cited

U.S. PATENT DOCUMENTS

| | | | | |
|---|---|---|---|---|
| 6,584,082 | B1* | 6/2003 | Willis | H04B 7/18584 370/316 |
| 9,015,274 | B2* | 4/2015 | Dorairaj | H04L 67/2833 709/203 |
| 9,066,138 | B1* | 6/2015 | Kraiman | H04N 21/458 |
| 9,292,826 | B1* | 3/2016 | Chen | H04L 1/1877 |
| 2006/0236095 | A1* | 10/2006 | Smith | H04L 63/0272 713/153 |
| 2007/0070890 | A1* | 3/2007 | Rojahn | H04L 41/0896 370/229 |
| 2007/0171926 | A1* | 7/2007 | Rachwalski | H04L 12/18 370/401 |
| 2013/0246631 | A1* | 9/2013 | Gonzales | H04N 21/6405 709/227 |
| 2014/0068690 | A1* | 3/2014 | Luthra | H04N 21/23430 725/110 |

(Continued)

*Primary Examiner* — Moustafa M Meky
*Assistant Examiner* — Thorne E Waugh
(74) *Attorney, Agent, or Firm* — Wolfe-SBMC

(57) ABSTRACT

Multiprotocol multicast streaming proxy techniques are described. In one or more implementations, a response is sent by a proxy service for receipt by a client device responsive to receipt of a request from the client device to obtain streaming data from a service provider via a network. The response indicates how the client device is to access a multicast of the streaming data from the proxy service and a single dedicated stream of the streaming data. Responsive to receipt of a request from the client device to receive the multicast, the streaming data is obtained by the proxy service via a single dedicated stream from the service provider and multicast for receipt by at least the client device.

20 Claims, 7 Drawing Sheets

(56) References Cited

U.S. PATENT DOCUMENTS

| | | | |
|---|---|---|---|
| 2014/0372624 A1* | 12/2014 | Wang | H04L 65/60 709/231 |
| 2016/0029050 A1* | 1/2016 | Thornburgh | H04N 21/23424 725/32 |
| 2016/0119395 A1* | 4/2016 | Li | H04L 12/189 709/219 |
| 2016/0164935 A1* | 6/2016 | Chen | H04L 1/1877 709/219 |

* cited by examiner

502
Receive a request from a client device at the proxy service to obtain streaming data from a service provider via a network, the streaming data available via a single dedicated stream via the network

504
Determine by the proxy service whether the streaming data is configured to be multicast by the proxy

506
Send a response by the proxy service for receipt by the client device, the response indicating how the client device is to access a multicast of the streaming data from the proxy service

508
Multicast the streaming data by the proxy service for receipt by at least the client device, the streaming data received via a subscription by the proxy service to the single end-to-end stream

510
Responsive to receipt of a request by the proxy service from another client device to access the streaming data and the request does not indicate that access to the multicast of the streaming data is desired, cause the streaming data to be streamed via the single dedicated stream to the client device

*Fig. 5*

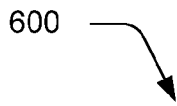

600

602
Send a request by a client device to obtain streaming data from a service provider via a network, the streaming data available via a single dedicated stream via the network

604
Receive a response by the client device from a proxy service, the response indicating how the client device is to access a multicast of the streaming data from the proxy service

606
Responsive to a request sent to join the multicast by the client device to the proxy service, receive the streaming data at the client device from the proxy service via the multicast

*Fig. 6*

MULTIPROTOCOL MULTICAST STREAMING PROXY

BACKGROUND

Users have access to an ever increasing variety of streaming data. For example, users may view video clips, television programming, movies, and so forth via a network. Conventional techniques used to stream data over a network, however, are inherently end-to-end and thus each user that requests a data stream receives an individual data stream that is dedicated for consumption by that respective user. This may be due to a variety of factors, such as limitations imposed by conventional network infrastructure, such as network firewalls.

In some instances, however, a large number of users may desire consumption of the same data stream. For example, a live event such as a sporting event, presidential speech, debate, and so on may be subscribed to by thousands of individual users within a single enterprise. Accordingly, a significant amount of network and computational resources may be consumed using these conventional techniques as each of the users is given access to an individual one of the streams even though each of the streams match, one to another.

SUMMARY

Multiprotocol multicast streaming proxy techniques are described. In one or more implementations, a response is sent by a proxy service for receipt by a client device responsive to receipt of a request from the client device to obtain streaming data from a service provider via a network. The response indicates how the client device is to access a multicast of the streaming data from the proxy service and a single dedicated stream of the streaming data. Responsive to receipt of a request from the client device to receive the multicast, the streaming data is obtained by the proxy service via a single dedicated stream from the service provider and multicast for receipt by at least the client device.

In one or more implementations, a request is received from a client device at a proxy service to obtain streaming data from a service provider via a network, the streaming data available via a single dedicated stream via the network. A response is sent by the proxy service for receipt by the client device, the response indicating how the client device is to access a multicast of the streaming data from the proxy service. The streaming data is also multicast by the proxy service for receipt by at least the client device, the streaming data received via a subscription by the proxy service to the single dedicated stream.

In one or more implementations, a request is sent by a client device to obtain streaming data from a service provider via a network, the streaming data available via a single dedicated stream via the network. A response is received by the client device from a proxy service, the response indicating how the client device is to access a multicast of the streaming data from the proxy. Responsive to a request sent to join the multicast by the client device to the proxy service, the streaming data is received at the client device from the proxy service via the multicast.

In one or more implementations, a system includes one or more modules implemented at least partially in hardware and configured to provide a proxy service. The one or more modules are configured to perform operations that include receiving a request from a client device at the proxy service to obtain streaming data from a service provider via a hypertext transfer protocol (HTTP) stream, sending a response by the proxy service for receipt by the client device, the response indicating how the client device is to access a multicast of the streaming data from the proxy, and responsive to receipt of a request by the proxy service from the client device to join the multicast, multicasting the streaming data by the proxy service for receipt by at least the client device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 is a flow diagram depicting a procedure in an example implementation in which a response is received that a data stream is available via a multicast.

FIG. 6 is a flow diagram depicting a procedure in an example implementation in which a client device requests to join a multicast.

DETAILED DESCRIPTION

Overview

Figure 1:
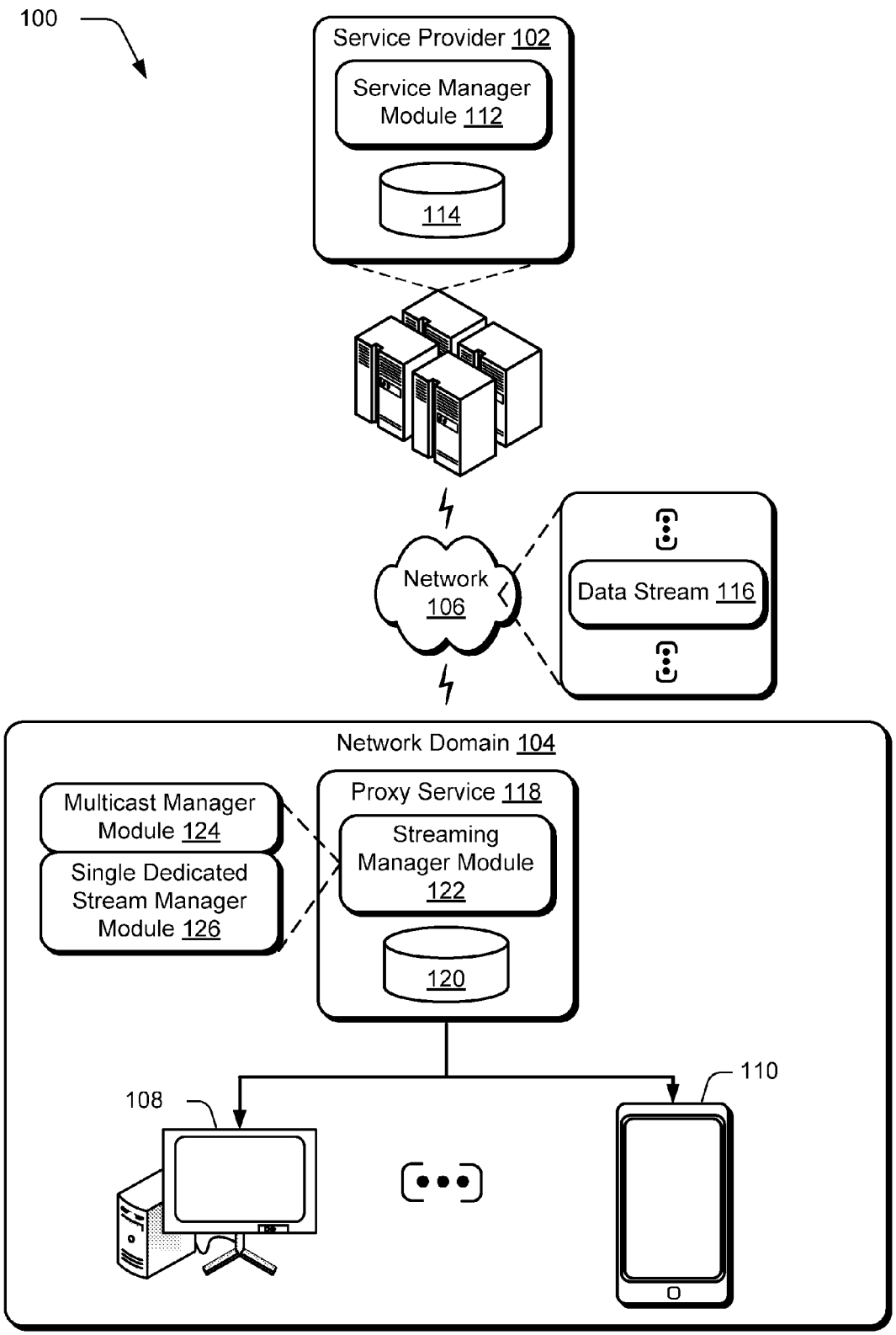
FIG. 1 is an illustration of an environment in an example implementation that is operable to employ proxy techniques described herein.

Multicast, such as native network and peer-to-peer, may be used to improve the efficiency of live media streaming, both in terms of load on servers and on shared network links. However, the Internet in general does not support transport of native multicast, as many enterprise firewalls block UDP and peer-to-peer traffic, and inter-site peer-to-peer traffic may have undesirable effects on network links in large enterprises. Conventional multicast solutions are therefore not practical for live streaming from the Internet, particularly to large enterprises.

Live media streaming may be accomplished with a variety of solutions, such as HTTP Dynamic Streaming (HDS) by Adobe®, HTTP Live Streaming (HLS) by Apple®, and others. These solutions leverage existing Internet infrastructure and strengths to deliver live streams in small, cache-friendly chunks. Each consumer/subscriber, using these conventional techniques however, requires a separate copy of the stream. Accordingly, these formats and delivery methods are inherently end-to-end and not multicast-amenable as each client device receives a dedicated stream. Although large enterprises and large ISPs may deploy caching HTTP proxies to reduce the number of copies of popular media that must traverse expensive and constrained network paths, these proxies then send individual copies of the requested media to each consumer/subscriber, and thus still consume significant network and computational resources.

Multiprotocol multicast streaming proxy techniques are described. In one or more implementations, client devices are adapted to accept and subscribe to multicast streams in addition to single dedicated end-to-end streams, such as HTTP streams from a proxy service. The dedicated end-to-end streams are described as "single" and "dedicated" in that the streams are configured for receipt by a single client device. The proxy service, for instance, may be adapted to subscribe to HTTP streams and redistribute the streams as multicasts. The proxy service may also notify the client devices of the availability of a multicast version of the stream.

For example, a client device may request a live HTTP stream as normal. The requests may be intercepted (e.g., by the network infrastructure) and communicated to the proxy service. The proxy service may then determine whether the stream may be multicast by the proxy service. If so, the proxy service may then inform the client device as to how to subscribe to a multicast in addition to how to retrieve the HTTP stream as requested. If the client device does request the multicast, the proxy service may subscribe to the HTTP stream and then multicast the stream via the network to reach each client that requests the multicast. A variety of other examples are also contemplated, further discussion of which may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the proxy techniques described herein. The illustrated environment 100 includes a service provider 102 communicatively coupled to a network domain 104 via a network 106, the network domain including a plurality of client devices 108, 110. Computing devices that implement the service provider and the client devices 108, 110 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some instances, (e.g., client devices 108, 110), the computing device may be representative of a plurality of different devices, such as multiple servers utilized by a business to perform operations "over the cloud" as illustrated for the service provider 102, further discussion of which may be found in relation to FIG. 7.

The service provider 102 is illustrated as including a service manager module 112 and storage 114 that are representative of functionality to communicate a data stream 116 via a network 106 in this instance. The data stream 116, for instance, may be configured as a sequence of digital encoded data packets that are utilized to communicate data from storage 114 via the network 106. The data packets may then be decoded and consumed in sequence to recreate the source data, such as a television program, movie, music, sporting event, and so forth.

As previously described, conventional techniques to stream data via the network 106 were limited to an end-to-end configuration in which a single dedicated data stream was sent to each client device 108, 110, individually, that desired to consume the data. One example of such a configuration is Hypertext Transfer Protocol (HTTP), which involves a structured text that uses logical links between nodes that contain text, an example of which is RFC 2616 that defines HTTP/1.1. Other examples are also contemplated.

The data stream 116 may be received by a network domain 104 via the network 106. A network domain 104 may describe a sub-network of client devices 108, 110 that may be controlled by network administrators via security and permissions for each of the client devices included in the domain, such as for an enterprise (e.g., a business), and so forth. Other sub-networks are also contemplated, such as workgroups, collections defined by a single Internet Service Provider (ISP), and so on. Thus, although a network domain 104 is illustrated other collections of client devices 108, 110 within a sub-network are also contemplated without departing from the spirit and scope thereof.

The network domain 104 is illustrated as including a proxy service 118. The proxy service 118 may be implemented in a variety of ways, such as a server, router, and so on. The proxy service 118 is representative of functionality that is configured to act as an intermediary between the client devices 108, 110 and the network 106. The proxy service 118, for instance, may include storage 120 to keep and manage locally stored versions of content requested by the client devices 108, 110, such as recently requested webpages such that requests for the content may be fulfilled without repeated access to the network 106 through use of the storage 120 as a cache. A variety of other functionality may also be incorporated as part of the proxy service 118, such as to implement security (e.g., act as a firewall), policies by a network administrator, and so forth.

The proxy service 118 is also illustrated as including a streaming manager module 122. The streaming manager module 122 is representative of functionality to manage a data stream to the client devices 108, 110 by the proxy service 118. The streaming manager module 122, for instance, may include a multicast manager module 124 that is representative of functionality to provide the data stream 116 via a multicast to the client devices 108, 110. The multicast manager module 124, for instance, may receive the data stream as a single dedicated stream (e.g., via HTTP) and multicast the data stream 116 within the network domain 104 or other sub-network. In this way, a "send once-receive by many" configuration may be employed to preserve computational and network resources by leveraging multicast recipient functionality of the client devices 108, 110 when available. Additionally, if multicast functionality is not available to the client devices 108, 110 (i.e., the client devices are not configured to subscribe to a multicast), the streaming manager module 122 may also provide a single dedicated data stream (e.g., via HTTP), functionality of which is represented by the dedicated stream manager module 126. Further discussion of multicast functionality that may be implemented by the proxy service 118 is described as follows and shown in corresponding figures.

Data Stream Multicasting

FIGS. 2-6 describe example systems 200, 300, 400 and procedures 500, 600, respectively, in which multiprotocol multicast streaming proxy techniques are described. FIGS. 5 and 6 are flow diagrams that describe steps in respective procedures 500, 600 in accordance with one or more embodiments. The procedures can be performed in connection with any suitable hardware, software, firmware, or combination thereof as further described in relation to FIGS. 1 and 7. In at least some embodiments, the procedure is performed, at least in part, by suitably-configured modules, such as a streaming manager module 122 of a proxy service 118, a communication module of a client device (e.g., when acting as a proxy to "downstream" client devices such as a set-top box or modem configuration), and so on. As such, the following discussion refers to FIGS. 2-6 in the description of this example functionality.

Figure 2:
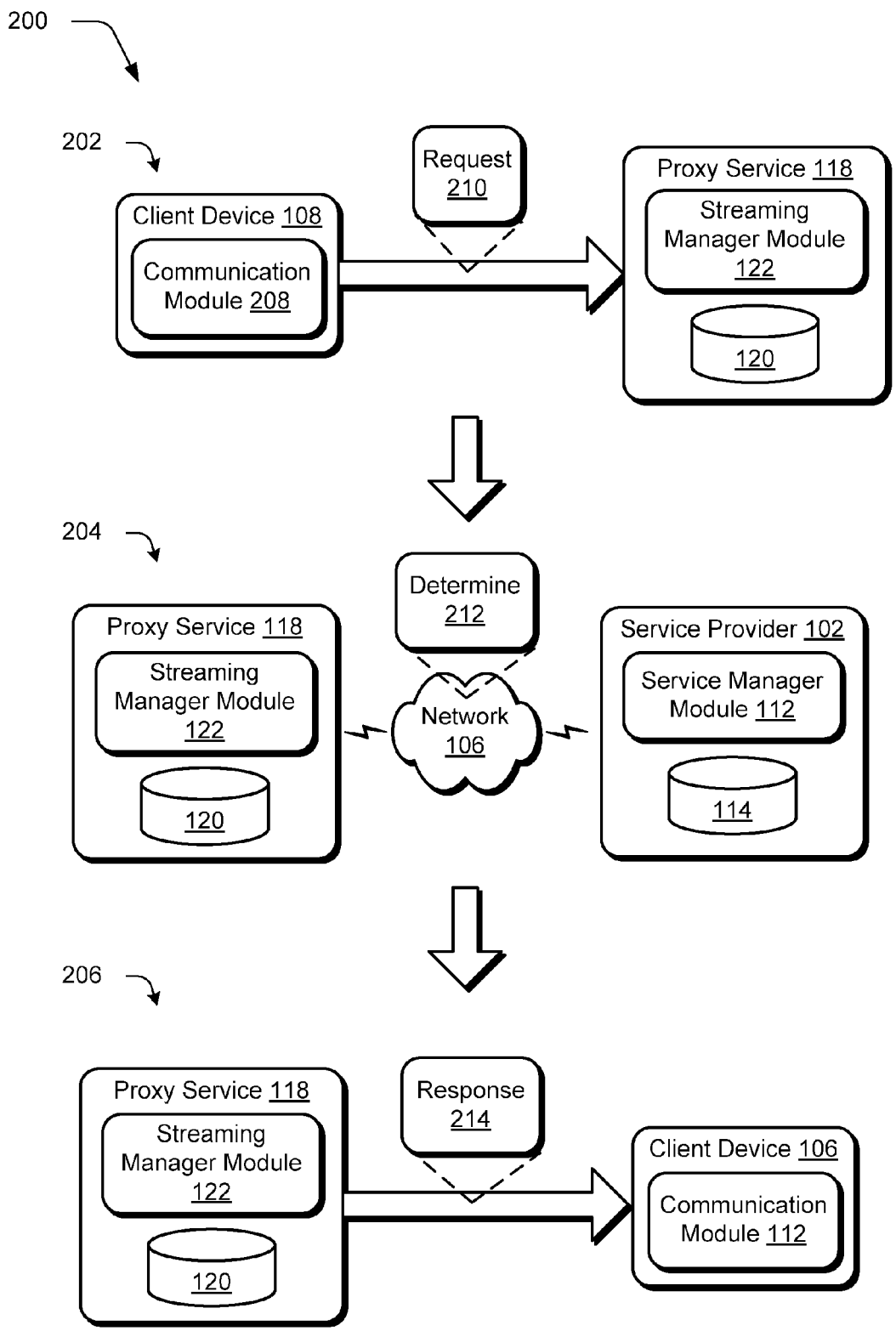
FIG. 2 depicts a system in an example implementation in which a client device requests a single dedicated data stream and in response receives a response that the data stream is available via a multicast.

FIG. 2 depicts a system 200 in an example implementation in which a client device requests a single dedicated data stream and in response receives a response that the data stream is available via a multicast. The system 200 is illustrated through the use of first, second, and third stages 202, 204, 206. At the first stage 202, the client device 108 includes a communication module 208 that is representative of functionality to communicate via a network, such as the network 106.

A request 210 is illustrated in this example as being received from a client device 108 at the proxy service to obtain streaming data from a service provider via a network, the streaming data available via a single dedicated stream via the network (block 502 of FIG. 5). The request 210, for instance, may be sent by a web browser, web-based application, or other configuration of the communication module 208 to obtain a data stream 216. As previously described, however, the data stream 216 may be configured as single dedicated data stream, which may take a variety of different forms, such as configured in accordance with a Hypertext Transfer Protocol (HTTP).

At the second stage 204, a determination is made by the proxy service as to whether the streaming data is configured to be multicast by the proxy (block 504 of FIG. 5). The streaming manager module 122 of the proxy service 118, for instance, may be compatible with specific formats of streaming data, such as streaming data configured in accordance with HDS from Adobe®, HLS from Apple®, and so on. Accordingly, the streaming manager module 122 may communicate with a service manager module 112 of the service provider 102 via the network 106 to determine 212 whether the requested data stream originating from the service provider 102 is supported. Other examples are also contemplated, such as through use of a lookup table to known service providers and thus a request is not made via the network 106 in such an instance.

At the third stage 206, the proxy service sends a response 210 for receipt by the client device, the response indicating how the client device is to access a multicast of the streaming data from the proxy service (block 506 of FIG. 5). Continuing with the previous example, the proxy service 118 may determine 212 that the data stream from the service provider 102 is compatible, and thus, may be made available via a multicast from the proxy service 118, e.g., through use of the multicast manager module 124.

The proxy service 118 may therefore generate and communicate a response 214 for receipt by the client device 106 that is indicative of this availability. The response 214 may be configured in a variety of ways. For example, the response may be included as part of a manifest (e.g., an HTTP streaming manifest), which is extended to support a "multicast available" flag. Other manifest configurations are also contemplated, such as in accordance with HLS from Apple® (e.g., using an .m3u8 file extension), HDS from Adobe® (e.g., using an .f4m extension), and so forth. In another example, the response may be included as part of the metadata accompanying the transmission of a streaming manifest, such as an additional response header in accordance with HTTP that indicates a "multicast available" flag. In this way, the client device 106 may be made aware that a multicast version of the streaming data is available and may therefore choose to access this multicast if supported, an example of which is described as follows and shown in a corresponding figure.

Figure 3:
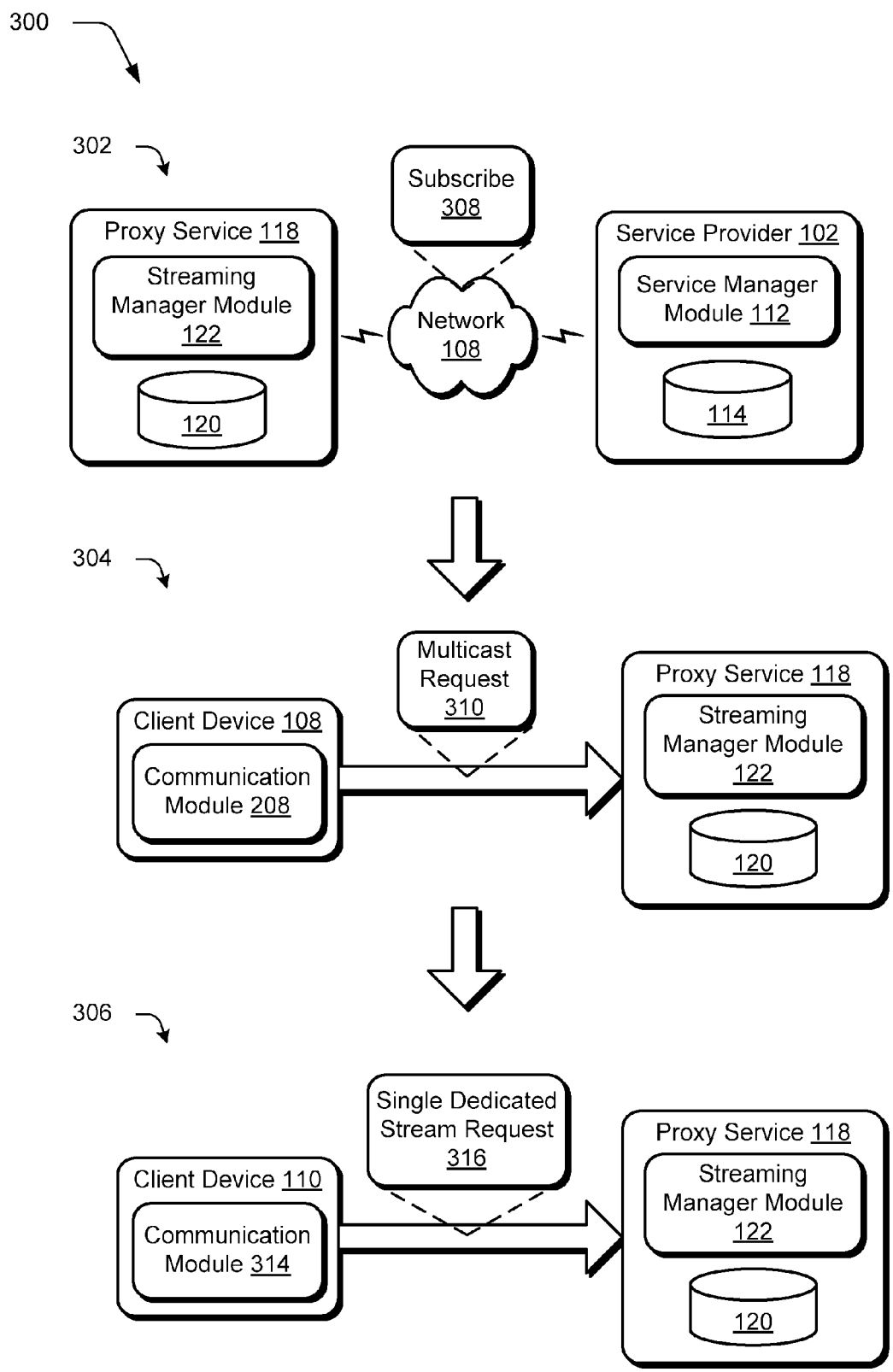
FIG. 3 depicts a system in an example implementation in which a proxy configures a single dedicated data stream for use as a multicast.

FIG. 3 depicts a system 300 in an example implementation in which a proxy configures a single dedicated data stream for use as a multicast. The system 300 is illustrated through the use of first, second, and third stages 302, 304, 306. At the first stage 302, a streaming manager module 122 of the proxy service subscribes 308 to receive the data stream 116 from the service provider 102, e.g., to receive the data stream 116 as a single dedicated stream. This may include requesting a manifest that indicates network locations from which fragments of the data stream may be obtained. As previously described, the dedicated stream is "single" in that the stream is configured for receipt by a single recipient, even though multiple streams may be used concurrently to communicate data, e.g., a single webpage communicated over multiple streams.

The streaming data may then be multicast by the proxy service for receipt by at least the client device, the streaming data received via the subscription by the proxy service to the single dedicated stream (block 508 of FIG. 5). A variety of different multicast techniques may be employed by the proxy service 118. For example, the multicasting may be performed as a network multicast that leverages infrastructure of the network to perform the multicasting of individual packets for receipt by a plurality of client devices 108, 110.

Thus, in this example the infrastructure of the network (e.g., network domain 104) may receive a single packet from the proxy service 118 that is indicated for multicast and create copies of the packet for receipt by respective client devices 108, 110 that request access to the multicast and thus act as a "one to many" communication. Other examples are also contemplated, such as to employ a peer-to-peer network multicast, a mesh network multicast, and so on in which nodes (e.g., peers or other client devices) may act to perform the "one to many" communication.

At the second stage 304, the communication module 208 of the client device 108 forms a multicast request 310 for communication to the proxy service 118 to join the multicast. The communication module 208 of client device 108, for instance, may be compatible with a multicast and thus request access to the multicast. In response, the client device 108 may receive an indication of how to subscribe to this multicast, further discussion of which may be found in relation to the description of FIG. 4 and shown in the figure.

At the third stage 306, the proxy service 118 may also support data streaming to a client device 110 that does not support multicast. For example, the client device 110 may include a communication module 314 that does not support subscription to the multicast of the proxy service 118. Therefore, the communication module 314 may examine the response 214 of FIG. 2, which may also describe how the client device 108 may receive a non-multicast version of the data stream 116 from the service provider 102. The manifest, for instance, may describe how the proxy service 118 subscribed 308 to the service provider 102 to receive the data stream as discussed in relation to the first stage 302, e.g., as an HTTP stream.

Therefore, responsive to receipt of a request by the proxy service 118 from another client device 110 to access the streaming data in which the request does not indicate that access to the multicast of the streaming data is desired, the streaming data is caused to be streamed via the single dedicated stream to the client device (block 510 of FIG. 5). The single dedicated stream, for instance, may be dedicated to receipt solely by a respective client device and no other as previously described through the use of "single" and "dedicated."

FIG. 6 depicts the above procedure from a client's point of view. For example, a request may be sent by a client device to obtain streaming data from a service provider via a network, the streaming data available via a single dedicated stream via the network (block 602). As described above, the request may be for an HTTP data stream from a service 102. The request, however, may be intercepted by the infrastructure of the network domain 104 and forwarded to a proxy service 118. The proxy service 118 may then make the determination of whether the data stream 116 is able to be multicast by the proxy service 118.

If so, a response may be received by the client device from the proxy service, the response indicating how the client device is to access a multicast of the streaming data from the proxy service (block 604). This may be performed in a variety of ways, such as through use of a URL extension as specified by a manifest.

Responsive to a request sent to join the multicast by the client device to the proxy service, the streaming data may be received at the client device from the proxy service via the multicast (block 606). The multicast, for instance, may be accessed by the client device through use of a URL extension such that access to the URL may be used to obtain the multicast of the streaming data, an example of which is described in greater detail in the following and shown in a corresponding figure.

Figure 4:
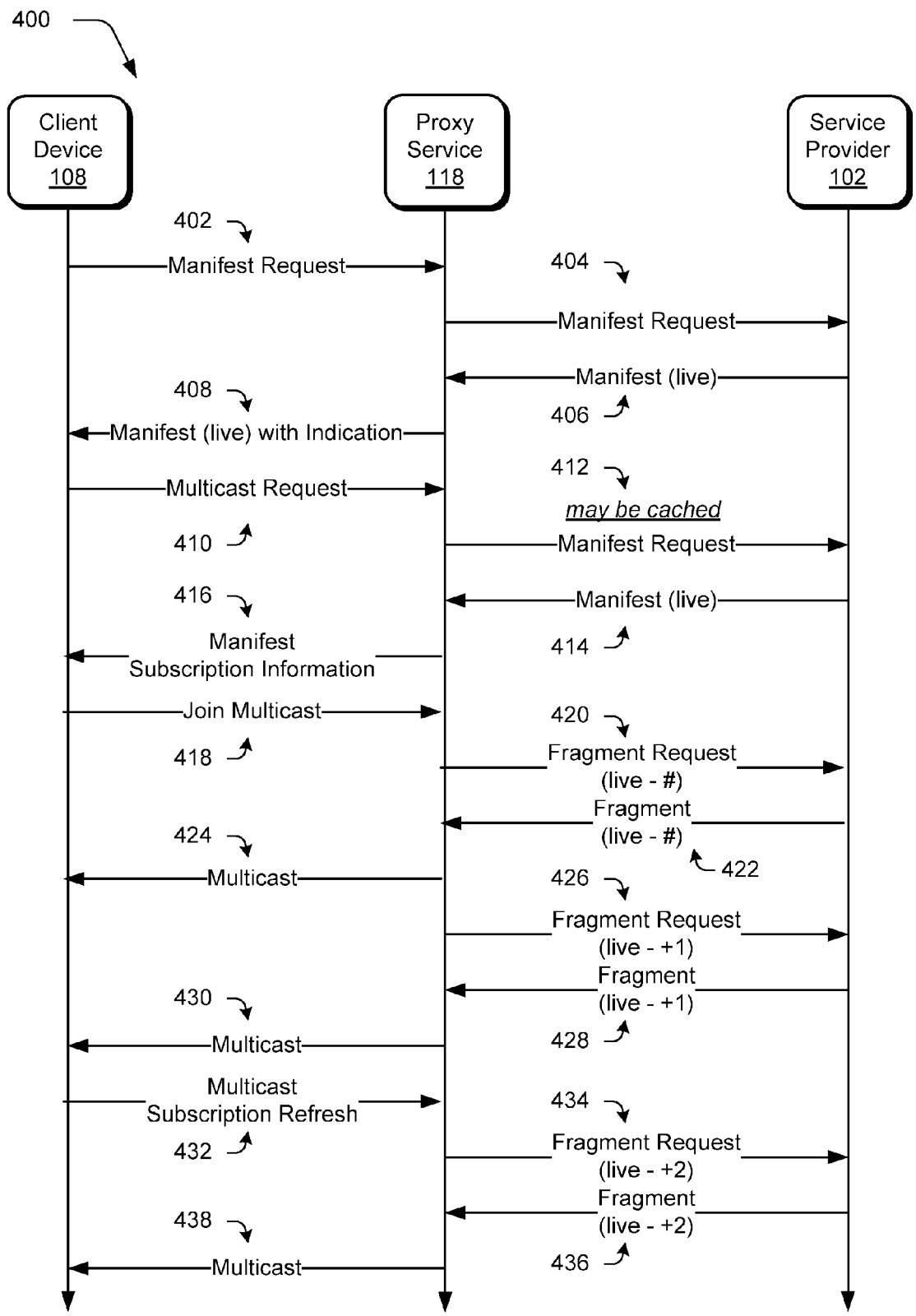
FIG. 4 depicts a system in an example implementation in which a request for a Hypertext Transfer Protocol (HTTP) data stream causes a proxy service to multicast the data stream.

FIG. 4 depicts a system 400 in an example implementation in which a request for a Hypertext Transfer Protocol (HTTP) data stream causes a proxy service to multicast the data stream. The system 400 as illustrated includes the client device 108, proxy service 118, and a service provider 102. Arrows and corresponding text are also illustrated to show communication between these devices, which also illustrate the function of the proxy service 118 as an intermediary between the client device 108 and the service provider 102.

A manifest request 402 is made from the client device to the proxy service 118, such as through interception of the request by infrastructure and forwarding to the proxy service 118. The proxy service 118 may then make a similar request for a manifest 404 from the service provider 102, and in response is provided with a manifest 406 that details "where" (e.g., which network addresses) from which fragments of a data stream may be obtained.

The proxy service 118 may then make a determination of whether multicast is able to be performed by the proxy service 118 as previously described, and if so, modify the manifest with an indication of "how" to obtain the multicast. The indication, for instance, may define a URL transformation for "multicast version of this stream", for example "http://example.com/stream.m3u8" may be transformed as "http://example.com/stream.m3u8.mmsp". The proxy service 118 may also be configured to route requests for compatible manifest URLs (example: *.m3u8, *.f4m), and multicast transformed manifest URLs (*.m3u8.mmsp, *.f4m.mmsp) to the multicast proxy. Thus, the proxy service 118 may add the "multicast available" flag to manifest files it retrieves on behalf of the client device 108, and may be added statelessly so that the proxy service 118 does not consume additional resources if the client device 108 does not request a multicast.

The client device 108, when multicast capable and thus configured to recognize a "multicast available" flag in stream manifest files, makes a multicast request 410 in this example, e.g., the transformed manifest URL instead of media fragments. The proxy service 118, on getting a request for a .mmsp URL, decodes the original manifest URL from the transformed URL, retrieves it 412, 414, and provides manifest subscription information 416 such that the client device may join the multicast 418. The .mmsp file, for instance, includes information usable to join the multicast, including some or all of IP multicast address & port number, RTMFP group specification, stream name, an RTMFP server for P2P introduction, and so on. The client device 108 may thus use this information to join the multicast rather than download media fragments directly from the service provider 102.

The proxy service 118 thus generates the .mmsp response and begins streaming the data from the service provider 102 as though it was a client by making fragment requests 420 and receiving fragments 422 in response which are then multicast 424 for receipt by the client device 108, the process of which may continue for subsequent fragments, 426, 428, 430. In one or more implementations, a multicast subscription refresh 432 may be performed by the client device 108 to the proxy service 118, e.g., at predefined intervals, as a "keep alive" so that the proxy service 118 continues to perform the multicast and thus may conserve resources if the multicast is no longer desired. A variety of other examples are also contemplated as previously described.

Example System and Device

Figure 7:
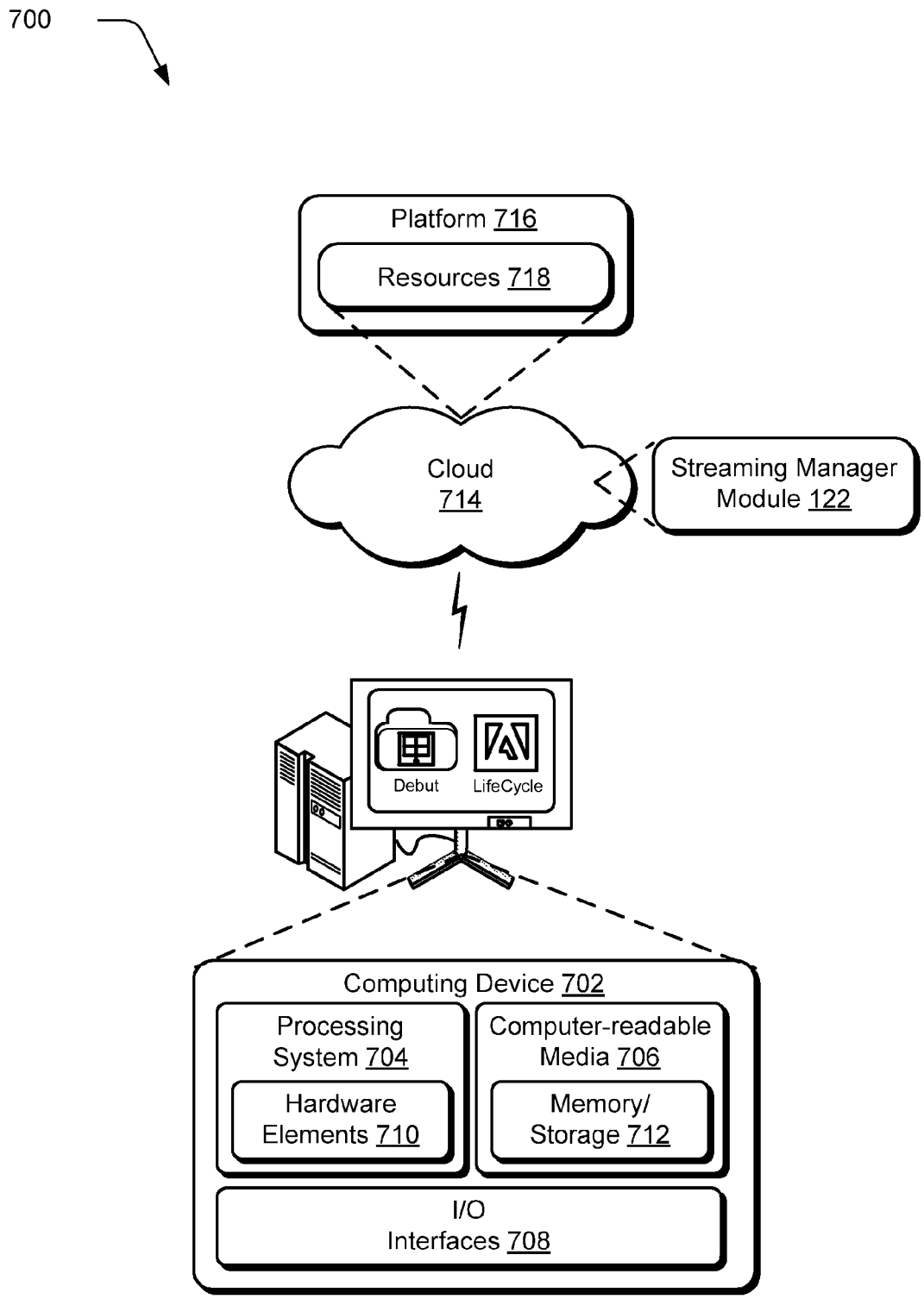
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the streaming manager module 122, which may be configured to act as a multicast intermediary as previously described.

The computing device 702 may be, for example, a server of a service provider, a device associated with a client (e.g., a client device), an on-chip system, and/or any other suitable computing device or computing system. The example computing device 702 as illustrated includes a processing system

704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices of a proxy service, the method comprising:
   responsive to receipt of a request from a client device to obtain streaming data from a service provider via a network, sending a response by the proxy service for receipt by the client device, the response indicating how the client device is to access:
     a multicast of the streaming data from the proxy service; and
     a single dedicated stream of the streaming data; and
   responsive to receipt of a request from the client device to receive the multicast, obtaining the streaming data by the proxy service via a single dedicated stream from the service provider and multicasting the streaming data for receipt by at least the client device.

2. The method as described in claim 1, wherein the single dedicated stream is configured in accordance with a hypertext transfer protocol (HTTP).

3. The method as described in claim 1, wherein the multicasting is performed as a network multicast that leverages infrastructure of the network to perform the multicasting of individual packets for receipt by a plurality of said client devices.

4. The method as described in claim 1, wherein the multicasting is performed via a peer-to-peer network or a mesh network.

5. The method as described in claim 1, wherein availability of the multicast is indicated in a header of the response.

6. The method as described in claim 1, wherein the response is configured as a manifest that is sent by the proxy service for receipt by the client device.

7. The method as described in claim 6, wherein the request by the client device to access the multicast is configured as described by the manifest.

8. The method as described in claim 1, wherein the request by the client device to access the multicast is made via a URL transformation.

9. The method as described in claim 1, wherein the client device and the proxy service are included within a network domain and the service provider is disposed outside of the network domain.

10. The method as described in claim 9, wherein the network domain corresponds to an enterprise or an internet service provider (ISP).

11. The method as described in claim 1, further comprising determining by the proxy service whether the streaming data is configured to be multicast by the proxy service.

12. The method as described in claim 1, further comprising responsive to receipt of a request by the proxy service from another client device to access the streaming data and the request does not indicate that access to the multicast of the streaming data is desired, causing the streaming data to be streamed via the single dedicated stream to the client device.

13. A system comprising:
   one or more modules implemented at least partially in hardware and configured to provide a proxy service, the one or more modules configured to perform operations comprising:
     responsive to receipt of a request from a client device to obtain streaming data from a service provider via a network, the service provider disposed outside a network domain that includes the proxy service and client device, sending a response by the proxy service for receipt by the client device, the response indicating how the client device is to access:
       a multicast of the streaming data from the proxy service; and
       a single dedicated stream of the streaming data; and
     responsive to receipt of a request from the client device to receive the multicast, obtaining the streaming data by the proxy service via a single dedicated stream from the service provider and multicasting the streaming data for receipt by at least the client device.

14. The system as described in claim 13, wherein the single dedicated stream is configured in accordance with a hypertext transfer protocol (HTTP).

15. The system as described in claim 13, wherein the multicasting is performed as a network multicast that leverages infrastructure of the network to perform the multicasting of individual packets for receipt by a plurality of said client devices.

16. The system as described in claim 13, wherein the multicasting is performed via a peer-to-peer network or a mesh network.

17. The system as described in claim 13, wherein the response is included in a header of a response that is sent by the proxy service to the client device.

18. The system as described in claim 13, wherein the response is included in a manifest that is sent by the proxy service for receipt by the client device.

19. A system comprising:
one or more modules implemented at least partially in hardware and configured to provide a proxy service, the one or more modules configured to perform operations comprising:
responsive to receipt of a request from a client device to obtain streaming data via a Hypertext Transfer Protocol (HTTP) stream from a service provider via a network, the service provider disposed outside a network domain that includes the proxy service and client device by a firewall, sending a response by the proxy service for receipt by the client device, the response indicating how the client device is to access:
a multicast of the streaming data from the proxy service; and
the HTTP stream of the streaming data; and
responsive to receipt of a request from the client device to receive the multicast, obtaining the streaming data by the proxy service via the HTTP stream from the service provider and multicasting the streaming data for receipt by at least the client device.

20. The system as described in claim 19, wherein the multicasting is performed via a peer-to-peer network or a mesh network.

* * * * *